US006691738B2

(12) United States Patent
Kuo et al.

(10) Patent No.: US 6,691,738 B2
(45) Date of Patent: Feb. 17, 2004

(54) FILLER FOR AIRTIGHT CONTAINER

(75) Inventors: Wen-Chang Kuo, Hsin-Chu (TW); Szu-Yao Wang, Hsin-Chu (TW); Wen-Hsiang Tseng, Hsinchu (TW)

(73) Assignee: Taiwan Semiconductor Manufacturing Co., Ltd., Hsin Chu (TW)

( * ) Notice: Subject to any disclaimer, the term of this patent is extended or adjusted under 35 U.S.C. 154(b) by 251 days.

(21) Appl. No.: 09/996,335

(22) Filed: Nov. 21, 2001

(65) Prior Publication Data

US 2003/0094205 A1 May 22, 2003

(51) Int. Cl.$^{7}$ .......................... G05D 7/00; F16L 37/00

(52) U.S. Cl. ...................... 137/588; 251/148; 141/332; 141/346

(58) Field of Search .......................... 137/588; 141/332, 141/346, 363, 387, 302, 297, 291; 222/400.7, 399; 251/148, 152

(56) References Cited

U.S. PATENT DOCUMENTS 913,949 A * 3/1909 Gold .......................... 137/588
3,170,667 A * 2/1965 Szohatzky ............... 251/149.6
4,502,516 A * 3/1985 Shields ....................... 141/290
5,038,840 A * 8/1991 Fair ............................ 141/83
5,435,342 A * 7/1995 Kohn et al. ................. 137/360
5,465,875 A * 11/1995 Garnett ....................... 222/148
5,526,956 A * 6/1996 Osgar .......................... 222/83

* cited by examiner

*Primary Examiner*—A. Michael Chambers
(74) *Attorney, Agent, or Firm*—Tung & Associates

(57) ABSTRACT

The present invention is directed to a filler assembly for dispensing liquid to and from a container capable of storing an indicated liquid. The filler assembly has a portable part and a stationary part cooperating to provide a sealed dispensing means for communicating an indicated liquid from an indicated liquid source to a container and for safely communicating the indicated liquid from the container to another location. The portable part and the stationary part are adapted to sealably mate together and further provide means for preventing misassembly of the two parts. The portable part provides dispensing means capable of communicating the liquid from the stationary part to a remote location. The stationary part is adapted to further sealably mate and communicate with a container capable of storing an indicated liquid.

19 Claims, 5 Drawing Sheets

FILLER FOR AIRTIGHT CONTAINER

FIELD OF THE INVENTION

The present invention is directed to a filler assembly for dispensing liquid to and from a container capable of storing an indicated liquid.

PRIOR ART

Currently, there is not a suitable filler to fill a container, such as an airtight tank or pump with an indicated liquid, particularly when the container is located in a difficult to access location. The indicated liquid may be either an indicated liquid or a gas. The current means for filling an airtight container involves removing the container to either refill the container or replacing the container when empty with a container filled with indicated liquid. Furthermore, the prior art does provide an effective seal to prevent against leakage.

Typically, the container of the prior art has an outlet vent that expels an indicated liquid such as gas to the atmosphere but does not provide any means for directing the flow of indicated liquid away from a user filling the container. Upon filling such an airtight container with an indicated liquid such as a pressurized gas or clean dry air, outgas in the container can leak to the atmosphere. If the container is filled with a particularly toxic or flammable indicated liquid, then a user performing the filling can be injured from the outgas.

For example filling airtight containers used in manufacturing semiconductors can be difficult because of the limited space involved in accessing the container. In such a process, the airtight container may be filled with a process liquid such as an inert gas such as $N_2$, $O_2$, $H_2$, Ar for use by a semiconductor processing machine.

In the semiconductor manufacturing process, such a filling process involves the use of two tanks, an indicated liquid tank and a supply tank, wherein the indicated liquid tank is located in a confined and limited space. To replace the indicated liquid stored in the indicated liquid tank, the tank must be removed and replaced with a new tank, which can be expensive. The filler assembly located on such an indicated liquid tank is fixed and does not provide for flexible filling or venting. In the present invention, the same container may be repeatedly filled and refilled without having to replace the entire container.

The present invention provides an improved filler assembly having a portable part and a stationary part cooperating to provide a sealed dispensing mechanism for filling a an airtight container.

The present invention provides a venting means in the form of a conduit having a quick connect connected thereto for directing release of pressurized gas or compressed dry air initially injected into the tank to be safely expelled from the tank and transported to a remote location away from the user.

SUMMARY OF THE INVENTION

It is the object of the present invention to have one refillable airtight supply container that can supply liquid from a supply source directly to a processing machine without the need for two tanks or airtight containers.

It is the object of the present invention to allow different indicated liquids to flow through an airtight supply container for communication of the indicated liquids to a container such as a semiconductor processing machine or an oil pump.

It is the object of the present invention to allow for a simple and an inexpensive filler assembly.

It is object to use a filler assembly for filling a container used in many different environments including industrial applications such as in the semiconductor manufacturing process.

The present invention is directed to a filler assembly for communicating an indicated liquid through a container comprising:

(a) a stationary part adapted to cover a container and having means to communicate an indicated liquid therethrough;

(b) a portable part adapted to releasably, sealably mate with the stationary part, the portable part in communication with an indicated liquid source and with the stationary part and in further communication with a remote location;

(c) means for sealingly mating the portable part to the stationary part;

(d) means for preventing movement between the stationary part and the portable part when the stationary part and the portable part are mated; and (e) means for preventing improper mating of the portable part with the stationary part.

In operation, the stationary part and the portable part cooperate to dispense an indicated liquid to a container and further cooperate to dispense the indicated liquid to a remote location in a safe manner. The portable part and stationary part are adapted to easily mate together in one configuration to form the filler assembly. There is only one way to assemble both the portable and the stationary parts to prevent movement there between.

The filler assembly provides the ability to fill a container with an indicated liquid wherein the container may be located in a limited space and wherein the means to direct an indicated liquid communicated from the container to a remote location. If there is excess pressure built up in the container, the pressure may be released in a safe manner away from the user filling the container with an indicated liquid.

The indicated liquid may be comprised of either an indicated liquid or a gas. When used in an application such as filling the container with semiconductor manufacturing machine processing liquids, gas from the liquid can be safely vented through the portable part to another location. Also clean dry air can be fed into an inlet of the container to remove any existing liquid in the container. Alternatively, such liquid could be suctioned pumped from container.

BRIEF DESCRIPTION OF THE DRAWINGS

The various features, advantages and other uses of the present invention will become more apparent by referring to the following detailed description and drawings in which.

DETAILED DESCRIPTION OF THE PREFERRED EMBODIMENT

Figure 1:
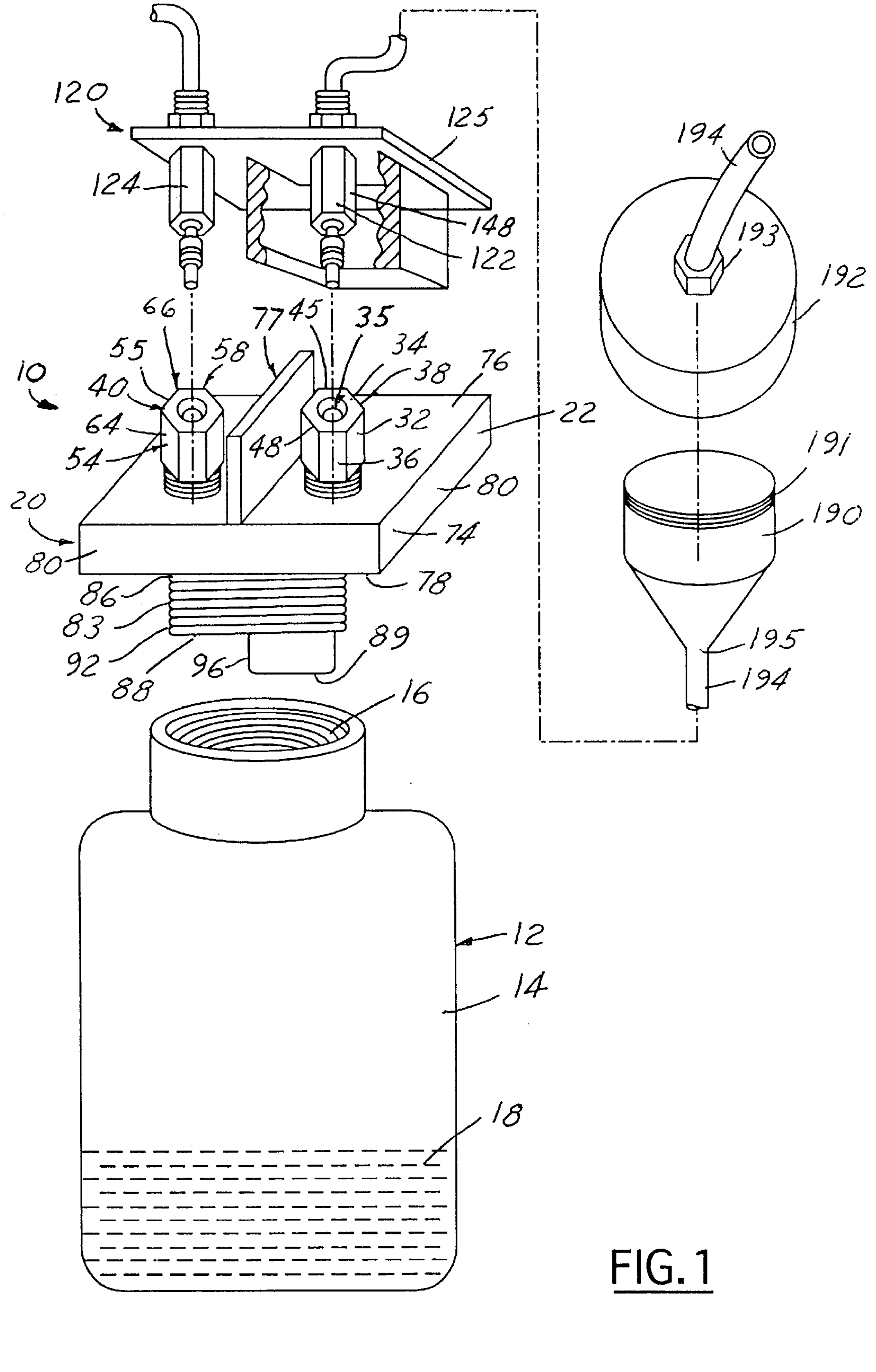
FIG. 1 is an environmental perspective view of a filler assembly according to the present invention.

Referring now to the drawings, as shown in FIGS. 1–13, the present invention generally comprises a filler assembly 10 for dispensing an indicated liquid 18 to and from a container 12 for storing the indicated liquid 18 comprising a stationary part 20 adapted to cover the container 12 and to communicate indicated liquid 18 therethrough; a portable part 120 adapted to sealably matingly connect to the stationary part 20 for communication of indicated liquid from an indicated liquid source 21 to the stationary part 20 and to dispense indicated liquid from the stationary part 20 in a safe manner to another location; means for sealingly connecting the portable part 120 to the stationary part 20; means for preventing movement between the stationary part and the portable part; means for properly mating the portable part 120 to the stationary part 20.

In a preferred embodiment as shown in FIG. 1, the container 12 has a storage compartment 14 for storing indicated liquid 18 capable of being used in an industrial application such as by a processing machine used in a semiconductor manufacturing process. The indicated liquid 18 is preferably an inert liquid gas such as $N_2$, Ar, $He_2$, $O_2$, Clean Dry Air, or a liquid such as oil. In the preferred embodiment, as shown in FIG. 1, the container 12 further comprises an open-ended threaded neck portion 16 that serves as a port 13 to the container in communication with the stationary part 20 for communication of the indicated liquid 18 therethrough.

The container 12 is preferably in the form of a cylindrical tank, as shown in FIG. 1, however the container 12 could be in the form of a pump or other apparatus designed to store indicated liquid 18 and having means capable of communicating with and mating with the stationary part 20.

The stationary part 20 is adapted to cover the container 12 and to sealably communicate the indicated liquid 18 therethrough. The stationary part 20 is adapted to sealingly engage the container 12 to prevent contamination of the indicated liquid 18 from exposure to the atmosphere.

As shown in FIGS. 1, 2, 4, 6, and 12, the stationary part 20 comprises at least a first quick connect 38; at least an second quick connect 40; a top part 22 wherein the top part is adapted to receive the at least two quick connects 38, 40; and a bottom part 83 integrally formed with the top part 22 comprising means for sealably securing the stationary part 20 to the container 12.

The quick connects 38, 40 are of the type well known in the mechanical arts. As shown in FIGS. 1, 2, 4, and 5, the at least two quick connects 38, 40 are preferably, threaded female connectors adapted to receive complementary male connectors, respectively, from the portable part 120. However, another quick connect used in the fluid arts adapted to mate with another complementary quick connect may be used.

The first quick connect 38 has an upper portion 32 having a planar upper surface 34 having an inlet 35 formed within and a side wall 36; and a lower hollow bottom cylindrical portion 50. Preferably, the planar upper surface 34 has a hexagonal arrangement and shares a peripheral edge 45 with the side wall 36. Preferably, the side wall 36 comprises a plurality of adjoining uniform, generally rectangular, flat faces of equal size 37, wherein the flat faces 37 are adjoined to form a preferably hexagonal arrangement sharing the hexagonal peripheral edge 45 with the planar upper surface 34.

Figure 4:
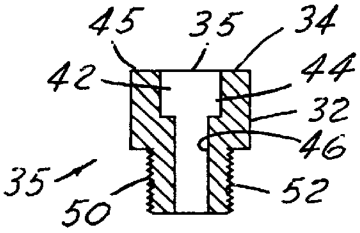
FIG. 4 is a cross-sectional view of a stationary part first quick connect.

As shown in FIG. 4, the first quick connect 38 further comprises a T-shaped channel 42 extending axially from the planar upper surface 34 towards the hollow bottom cylindrical portion 50. The hollow bottom cylindrical portion 50 has exterior male threads 52 for threadably engaging a recess disposed within the top part 22.

The T-shaped channel 42 is formed from two coaxial cylindrical bores 44, 46 having differing uniform diameters. The bores 44, 46 are juxtaposed in axial relation within the female quick connect 38 such that the cylindrical bore 44 has a predetermined depth and extends axially downwardly from the planar upper surface 34 towards the hollow bottom cylindrical portion 50. The cylindrical bore 44 is formed above the lower cylindrical bore 46 and is in communication with the lower cylindrical bore 46. Additionally, the upper cylindrical bore 44 has a greater diameter than the lower cylindrical bore 46.

Figure 5:
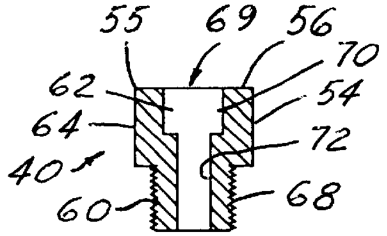
FIG. 5 is a cross-sectional view of a stationary part second quick connect.

As shown in FIG. 5, the second quick connect 40 has an upper portion 54 having a planar upper surface 56 having an outlet 69 formed within and a side wall 64; and a lower hollow bottom cylindrical portion 60. Preferably, the planar upper surface 56 has a hexagonal arrangement and shares a peripheral edge 55 with the side wall 64. Preferably, the side wall 64 comprises a plurality of adjoining uniform, generally rectangular, flat faces of equal size 67, wherein the flat faces 67 are adjoined to form a preferably hexagonal arrangement sharing the hexagonal peripheral edge 55 with the planar upper surface 56. The first quick connect 40 further comprises a T-shaped channel 62 extending axially from the planar upper surface 56 towards the lower hollow bottom cylindrical portion 60. The lower hollow bottom cylindrical portion 60 has exterior male threads 68 for threadably engaging a recess disposed within the top part 22.

The T-shaped channel 62 is formed from two coaxial cylindrical bores 70, 72 having differing uniform diameters. The bores 70, 72 are juxtaposed in axial relation within the second quick connect 40 such that the cylindrical bore 70 has a predetermined depth and extends axially downwardly from the planar upper surface 56 towards the hollow bottom cylindrical portion 60. The cylindrical bore 70 is formed above the lower cylindrical bore 72 and is in communication with the lower cylindrical bore 72. Additionally, the upper cylindrical bore 70 has a greater diameter than the lower cylindrical bore 72. Preferably, the upper cylindrical bores 44 and 72 have differing diameters wherein the bore 44 has a diameter of ½" and the bore 70 has a diameter of ⅜", thus preventing a connector having a diameter greater than ⅜" from being inserted into the bore 70. Alternatively, the bore 70 may have a diameter of ½" and the bore 44 may have a diameter of ⅜" to prevent a connector having a diameter greater than ⅜" from being inserted into the bore 44.

As shown in FIGS. 1, 2, 6, and 12, the top part 22 and bottom part 83 may be made from anti-corrosive materials such as stainless steel or plastic. If the stationary part 20 is made of metal, then manufacturing means such as machining the top part 22 and the bottom part 83 from one part, or welding the bottom part 83 to the top part 22 may be used to integrally form the top part 22 with the bottom part 83, thus permanently securing the bottom part 83 to the top part 22 and preventing any gap between the two parts. Alternatively, if the stationary part 20 is comprised of plastic material, then molding the top and bottom parts together is preferable.

The top part 22 of the stationary part 20 comprises a uniform portion 74 integrally formed with the bottom part 83. The uniform portion 74 has an upper surface 76, a bottom surface 78 wherein the two uniform surfaces 76, 78 are dimensioned the same, and a side wall 70 disposed between the upper surface 76 and the bottom surface 78 wherein the side wall comprises a plurality of uniformly dimensioned faces 80. The uniform portion 74 is preferably in the shape of a square block as shown in FIG. 1, to allow for easy adjustment of the stationary part 20 in relation to the container 12, when using a standard adjustable tool such as a wrench. However, the shape could be any symmetrical solid having a planner upper and bottom surface such as cylindrical, or polygonal including but not limited to hexagonal, and rectangular.

Figure 2:
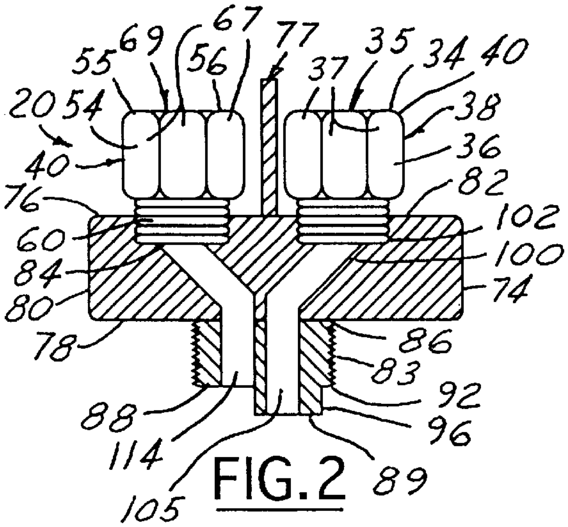
FIG. 2 is a partial cross-sectional view of two stationary part quick connects mounted on a stationary part.
Figure 3:
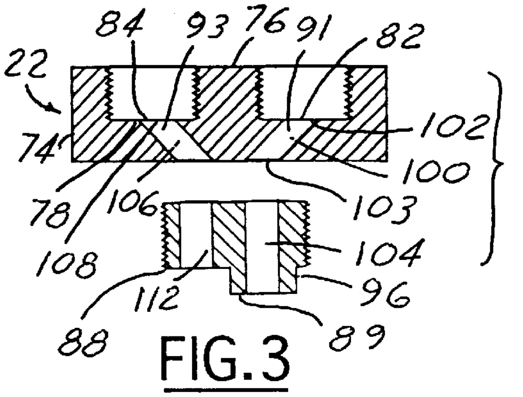
FIG. 3 is a cross-sectional view of a stationary part without a pair of stationary part quick connects mounted thereon.

As shown in FIGS. 2–3, the upper surface 76 of the uniform portion 74 comprises at least a first recess 82 and at least a second recess 84 formed therein for sealably receiving the at least two quick connects, 38, 40, respectively. Each recess 82, 83 has an opening 91, 93 disposed respectively therein. The at least two recesses 82, 84 are complementary in shape to the at least two quick connects 38, 40, respectively, and preferably, comprise female threads 81, 87 for receiving the male threads 52, 68 of the quick connects 38, 40.

As shown in FIGS. 1, 2, 6, and 12, the top part upper surface 76 further comprises an extended upper portion in the form of an idiot proof block 77 adapted to engage an idiot proof ring formed on the portable part 120 as described further below. The idiot proof block 77 has a preferably, uniform shape and is integrally formed with the upper surface 76 of the top part 22. The idiot proof block 77 is positioned between the at least two recesses 82, 84, but is not equidistant from both recesses 82, 84. As shown in FIGS. 1, 2, 6, and 12, the idiot proof block 77 is formed adjacent to the first stationary quick connect recess 82 but is spaced a distance apart from the second stationary quick connect recess 84. However, in an alternative embodiment (not shown), the idiot proof block 77 may be formed closest to the second stationary quick recess 84.

As shown in FIGS. 1, 2, 6, and 12, the bottom part 83 is integrally formed with the bottom surface 78 of the top part 22 uniform portion 74. The bottom part 83 of the stationary part 20 comprises a uniform cylindrical portion 85 having a radius R adapted to mate with the cylindrical neck portion 16 of the container 12. The uniform cylindrical portion 85 having a top surface 86 integrally formed with the bottom surface 78 of the top part 22; and a bottom surface 88. The upper cylindrical portion 85 further comprises an outer side wall 92 axially disposed between the top surface 86 and the bottom surface 88. The outer side wall 92 of the uniform cylindrical portion 85 has male threads 94 integrally formed therewith.

The bottom surface 88 of the cylindrical portion 85 has an extended portion 96 extending downwardly axially away from the bottom surface 88 of the cylindrical portion 85. The extended portion 96 is juxtaposed beneath the outer side wall 92 of the cylindrical portion 85 extending radially inwardly a distance slightly less than R. The extended portion 96 has a planar bottom surface 89 formed thereon. The extended portion 96 may be integrally formed with the uniform cylindrical portion 86 by means such as machining the extended portion 96 from a portion of the uniform cylindrical portion 88 or by welding the extended portion 96 to the uniform cylindrical portion 85.

In practice, when the threaded neck portion 16 of the container 12 receives the threads 94 of the uniform cylindrical portion outer wall 92, an airtight seal is formed between the uniform cylindrical portion outer wall 92 and the threaded neck portion 16 of the container 12. The extended portion 96 prevents a siphon from forming when indicated liquid 18 is communicated from the storage compartment 14 of the container 12 to the stationary part 20 second quick connect outlet 69.

As shown in FIG. 3, the stationary part 10 further comprises means for communicating indicated liquid 18 from the portable part 120 through the stationary part 20 to the first storage compartment 14 of the container 12. The means comprise a first bore 100 having a first bore first end 102 in communication with the inlet 35 of the stationary part 20 first quick connect 38 and a first bore second end 103 in communication with the storage compartment 14. The first bore 100 is angularly disposed within the top part uniform portion 74 extending at an angle from the upper surface first recess opening 91 inwardly and downwardly towards the bottom surface 78 of the uniform portion 74. The end 102 of the angular bore 100 is in communication with a second bore 104 disposed within the cylindrical portion 85 and within the extended portion 96 of the stationary part 20 to form a continuous channel 105, as shown in FIG. 2, extending from the recess 82 of the uniform portion 74 to the extended portion bottom surface 89.

The stationary part 20 further comprises means for communicating indicated liquid 18 from the storage compartment 14 of the container 12 and then through the outlet 69 of the stationary part 20 second quick connect 40 to the portable part 120, the means comprising a third bore 106 having a third bore first end 108 in communication with the outlet 69 of the stationary part 20 and a third bore second end 110 in communication with the storage compartment 14. The third bore 106 is angularly disposed within the top part uniform portion 74 extending at an angle from the upper surface second recess 84 inwardly and downwardly towards the bottom surface 78 of the uniform portion 74. The end of the angular bore 106 is in communication with a forth bore 112 disposed within the uniform cylindrical portion 85 of the stationary part 20 to form a continuous channel 114 extending from the second recess opening 93 of the uniform portion 74 to the bottom surface 88 of the cylindrical portion 85 of the stationary part 20.

Alternatively, the first channel 105 may be formed by a single straight bore disposed between the first recess opening 91 and the bottom surface 89 of the extended portion 96, and the second channel 114 also may be formed by a single straight bore disposed between the second recess opening 93 and the bottom surface 88 of the cylindrical portion 85.

The portable part 120 comprises at least one portable quick connect inlet 122 adapted to mate with the stationary part 20 first quick connect inlet 38, at least one portable quick connect outlet 124 adapted to mate with the stationary part second quick connect 40; a quick connect mounting block 125 having means for mounting the at least two portable quick connects 122, 124; means for securely communicating indicated liquid from an indicated liquid source to the inlet 35 of the stationary part 20; and means for communicating indicated liquid from the outlet 69 of the stationary part 20 to a remote location.

The at least one portable quick connect inlet 122 comprises a connector portion 126; and a mounting portion 134 integrally formed with the connector portion 126.

The connector portion 126 is complementary to and is adapted to mate with the stationary first. The connector portion 126 is preferably, a male connector complementary in shape to the T-shaped channel 42 of the stationary first quick connect 38 having a bottom opening 135 in communication with the inlet 35 of the stationary first quick connect 38. The connector portion 126 preferably, has an upper cylindrical portion 128 and a lower cylindrical portion 130 coaxially and integrally formed with the upper cylindrical portion 128. Each cylindrical portion 128, 130 has a different uniform diameter wherein the upper cylindrical portion 128 has a diameter slightly less than the diameter of the bore 44 but larger than the diameter of the bore 46 of the stationary part first quick connect 38, and wherein the lower cylindrical portion 130 has a diameter slightly less than the diameter of the bore 46.

The connector portion 126 further comprises sealing means, wherein the sealing means is preferably an O-ring 132 attached to the connector upper cylindrical portion 128 for sealingly engaging the T-shaped channel 42 of the stationary inlet quick connect 38 when the stationary part 20 mates with the portable part 120.

The connector mounting portion 134 is integrally formed with the connector portion 126 and is adapted to mount the at least one portable quick connect inlet 122 to the mounting block 125 comprising an upper threaded portion 136, and a lower portion 138 wherein the lower portion 138 is integrally formed with and disposed between the upper threaded portion 136 and the upper cylindrical portion 128 of the connector portion 126. The upper threaded portion 136 is cylindrical having exterior male threads 140 adapted to receive a nut 188 and further comprises a top opening 154.

The lower portion 138 of the mounting portion 134 further comprises a side wall 146 juxtaposed beneath and in axial alignment with the upper threaded portion 136, the side wall 146 protruding radially outwardly a distance beyond the male threads 140 of the upper portion 136. Preferably, the side wall 146 comprises a plurality of adjoining uniform, generally rectangular, flat faces of equal size 148, wherein the flat faces of equal size 148 are adjoined to form a preferably hexagonal arrangement. Alternatively, the side wall 146 of the mounting portion 134 could have a cylindrical shape.

The portable quick connect inlet 122 further comprises a portable quick connect inlet bore 152 extending axially downwardly from the top opening 154 of the upper threaded portion 136 to the bottom opening 135 of the connector portion 126 to communicate indicated liquid from a conduit in communication with an indicated liquid source to the inlet 35 of the stationary part 20.

As shown in FIGS. 1, 6–9, 12, and 13, the at least one portable quick connect outlet 124 comprises a connector portion 142; and a mounting portion 144 integrally formed with the connector portion 142.

The connector portion 142 is adapted to mate with the stationary second quick connect 40 and is preferably, a male connector complementary in shape to the T-shaped channel 62 of the stationary second quick connect 40 having a bottom opening 150 in communication with the outlet 69 of the stationary outlet quick connect 40. The connector portion 142 preferably, has an upper cylindrical portion 152 and a lower cylindrical portion 164 coaxially and integrally formed with the upper cylindrical portion 162. Each cylindrical portion 152, 164 has a different uniform diameter wherein the upper cylindrical portion 152 has a diameter slightly less than the diameter of the bore 70 but larger than the diameter of the bore 72 of the stationary part second quick connect 40, and wherein the lower cylindrical portion 164 has a diameter slightly less than the diameter of the bore 72.

Preferably, the upper cylindrical portion 152 has a diameter slightly less than ⅜". Preferably, the upper cylindrical portion 128 has a diameter slightly less than ½" but greater than ⅜" to prevent the male connector portion 126 from being mis-assembled and inserted into the stationary outlet quick connect 40, instead of into the stationary inlet quick connect 38. Alternatively, if the bore 70 of the second quick connect 40 has a diameter of ½" and the bore 44 has a diameter of ⅜", then the upper cylindrical portion 152 may have a diameter greater than ⅜" to prevent a connector having a diameter greater than ⅜" from being inserted into the bore 44.

Figure 13:
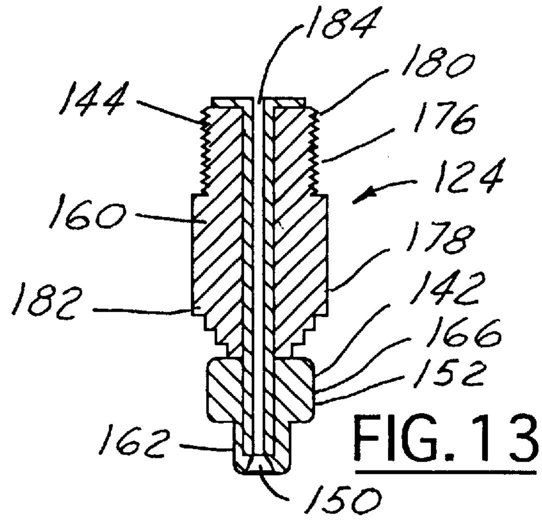
FIG. 13 is a cross-sectional view of a portable quick connect outlet.

As shown in FIG. 13, the connector portion 142 further comprises sealing means, wherein the sealing means is preferably an O-ring 166 attached to the upper cylindrical portion 152 for sealingly engaging the T-shaped channel 62 of the stationary second quick connect 40 when the stationary part 20 mates with the portable part 120.

The mounting portion 144 is adapted to mount the at least one portable quick connect outlet 124 to the mounting block 125 comprising an upper threaded portion 176, and a lower portion 178 wherein the lower portion 178 is integrally formed with and disposed between the upper threaded portion 152 and the upper cylindrical portion 142 of the connector portion 186. Preferably, the upper threaded portion 186 is cylindrical having exterior male threads 180 adapted to receive an outlet nut 204 and further comprises a top opening 182.

The lower portion 178 further comprises a side wall 182 juxtaposed to the upper threaded portion 176 and protruding radially a distance beyond the threads of the upper portion. Preferably, the side wall 182 comprises a plurality of adjoining uniform, generally rectangular, flat faces of equal size 185, wherein the flat faces of equal size 185 are adjoined to form a preferably hexagonal arrangement. Alternatively, the side wall 182 of the lower portion 178 could have a cylindrical portion.

The portable quick connect outlet 124 further comprises a portable quick connect outlet bore 162 extending axially downwardly from the top opening 184 of the upper threaded mounting portion 176 to the bottom opening 150 of the connector portion 152 to communicate indicated liquid from the outlet 35 of the stationary part 20 to the portable part quick connect outlet bore 162.

Figure 9:
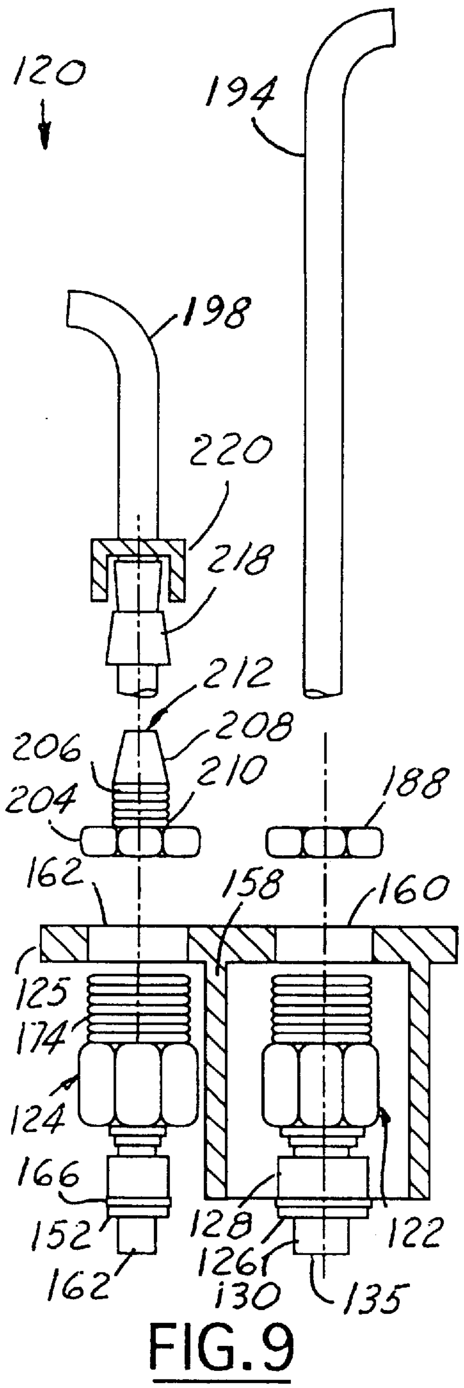
FIG. 9 is a partial cross-sectional exploded view showing a quick connector mounting assembly.
Figure 10:
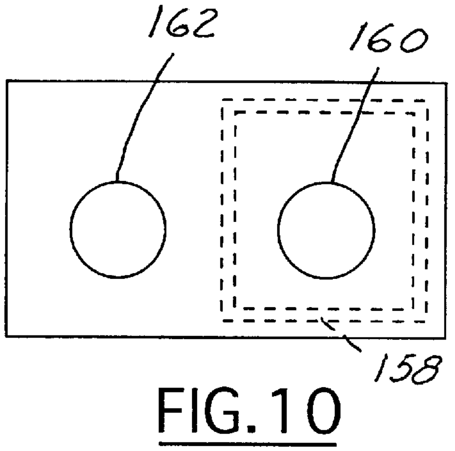
FIG. 10 is a plan view of a portable part mounting block.

As shown in FIGS. 9–10, the quick connect mounting block 125 has means for mounting the quick connects 122, 124 to the quick connect mounting block 125 comprising a first bore 160 and a second bore 162 disposed within the mounting block, wherein the first bore 160 receives the upper threaded portion 136 of the portable part inlet quick connect 122 and the second bore 162 receives the upper threaded portion 152 of the portable part quick connect outlet 124, and wherein the second bore 162 is spaced apart from the first bore 160.

In practice, the quick connects 122, 124 are inserted respectively through the bores 160, 162. The inlet nut 188 then engages the threads of the portable quick connect inlet 122 to retain the portable quick connect inlet 122 in mounting engagement with the mounting block 125. Similarly, the outlet nut 204 engages the portable quick connect inlet 124 to retain the portable quick connect inlet 124 in mounting engagement with the mounting block 125.

Additionally, as shown in FIG. 9, the portable part further comprises communicating fluid from the outlet of the stationary second quick connect 40 to a remote location wherein the means comprises the portable quick connect quick connect outlet 40 cooperating with an outlet conduit 96 and wherein the portable part further comprises means for retaining the outlet conduit 196 to communicate indicated liquid therethrough. The retaining means is an assembly adapted to receive a flexible conduit comprising the outlet nut 204; a tapered member 208; a collar member 220, the collar adapted to receive the tapered member 208 and to mate with the outlet nut 204, wherein the tapered member is disposed between the outlet nut 204 and the collar when the three retaining means members are mated together.

The outlet nut has a bore 217 disposed therethrough and further comprises: a nut portion 205 having interior female threads 206; a tapered portion 208 having a base portion 210 and a top portion 211, the top portion having an opening 212 disposed therein. The base portion 210 is wider near the nut portion 205 and extends axially upwardly from the nut portion 205 in a tapered manner such that the wider portion near the nut portion 205 has exterior male threads 213 for receiving the collar. The top portion 211 further comprises a protruded ribbed portion 215 having a plurality of protuberances extending radially along an exterior surface of the top portion for receiving a conduit.

The tapered member is complementary in shape to the protruded ribbed tapered portion of the top portion 211 having an opening 219 disposed therethrough for receiving a conduit.

The collar member 220 is an inverted U-shaped member having an axial bore disposed therethrough for receiving a conduit and female threads disposed within the member adapted to engage the exterior male threads of the base threaded portion.

In practice, the outlet conduit 196 is inserted through the bores of the retaining means assembly and is fixedly attached to the ribbed portion of the nut 204. The tapered member is then seated over the conduit 196 and the collar member 220 engages the threads of the nut member 204 to retain the conduit 196 in sealable engagement. The retaining means should not be limited to the means disclosed herein, any conventional and suitable means for retaining the conduit 196 to allow the conduit 196 to communicate with the portable quick connect outlet 124 can be used.

As shown in FIGS. 1, 6, 8–10, and 12, the portable part 120 further comprises an idiot-proof ring 158 adapted to engage the idiot-proof block 77 of the stationary part 20. As shown in FIG. 10, the idiot proof ring 158 is square in shape but, in an alternative embodiment, another shape complementary to the idiot proof block 77 could be used.

The idiot proof ring 158 has a side wall 170 having an interior 172 adapted to surround the idiot proof block 77 and either one of the quick connects 38, 40 of the stationary part 20, the interior 172 having a portion 174 formed between the side wall 170 and the surrounded stationary quick connect complementary in shape to the idiot proof block 77 such that when the stationary part 20 mates with the portable part 120, the side wall 170 of the idiot proof ring closest to the idiot proof block 77 engages the idiot proof block 77 The cooperation of the idiot proof ring 158 and the idiot proof block define the means to prevent movement there between wherein the movement preventing means is designed to prevent any torque or movement between the stationary part and the portable part when both parts are sealably mated.

Figure 11:
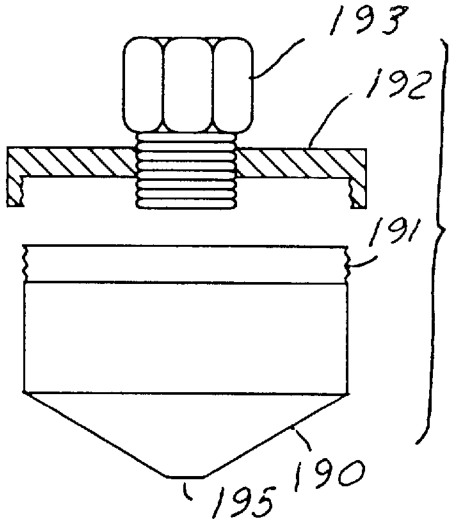
FIG. 11 is an exploded view of a portable part cover having an inlet, and a funnel.

As shown in FIGS. 1 and 11, the portable part further comprises the means for communicating indicated liquid from an indicated liquid source to the at least one portable part quick connect inlet 122, wherein the means for communicating comprises a funnel 190 having a threaded portion 191 adapted to receive a cover, the funnel having an outlet portion 195 in communication with the at least one portable quick connect inlet 122; a cover 192 for the funnel having an inlet 193 in communication with an indicated liquid source; and a conduit 194 extending from the funnel outlet portion 195 to the portable quick connect inlet 122 to communicate indicated liquid 18 from an indicated liquid source 21 therethrough. The funnel 190 is preferably made of stainless steel and the conduit 194 is preferably, an extended flexible plastic hose. The cover inlet 193 may be directly connected to an indicated liquid source 21 or may be connected through a conduit 197 in communication with an indicated liquid source.

Figure 8:
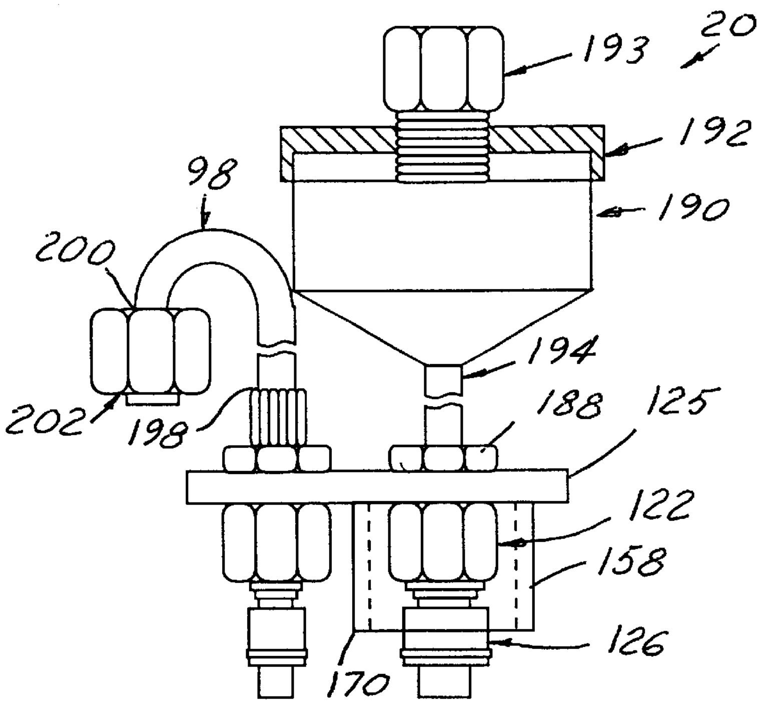
FIG. 8 is a partial cross-sectional view of a portable part.
Figure 6:
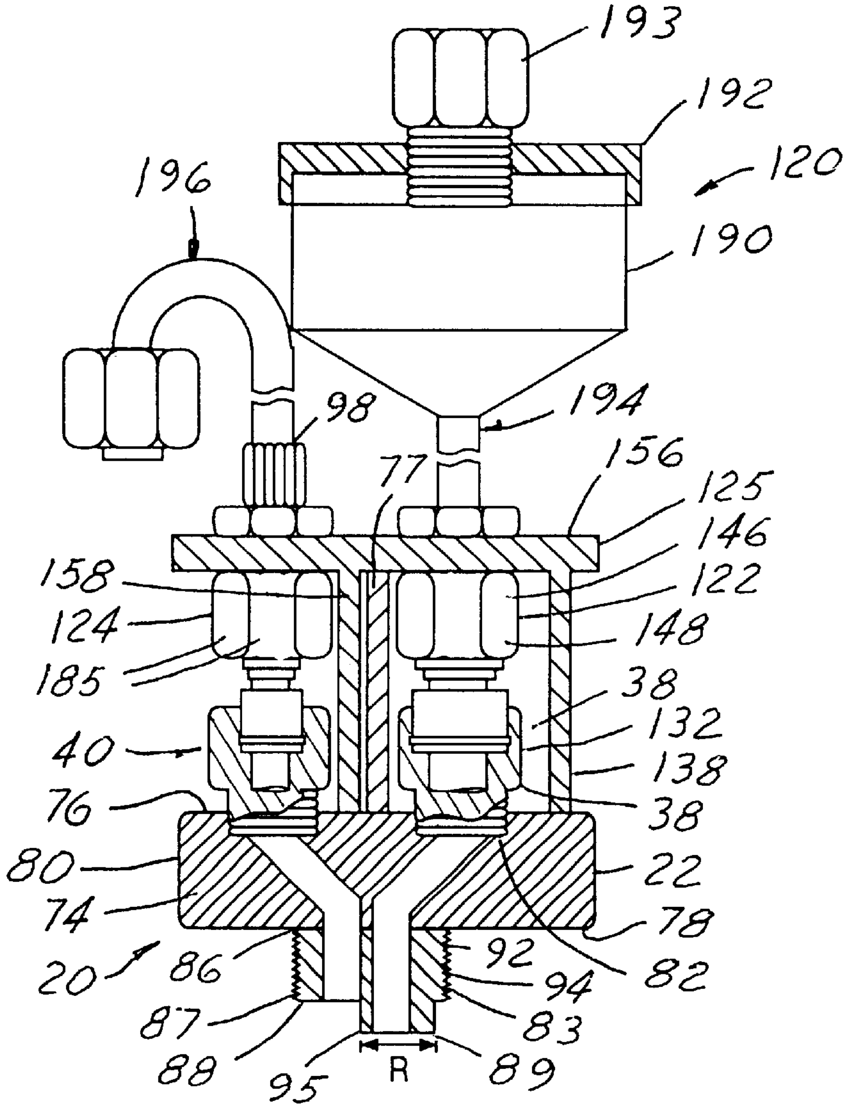
FIG. 6 is a partial cross-sectional view of a stationary part and a portable part mated together showing the detail of a portable quick connect inlet and a portable quick connect outlet.
Figure 7:
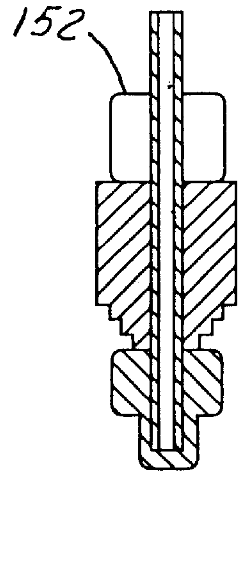
FIG. 7 is a cross-sectional view of a portable quick connect inlet.
Figure 12:
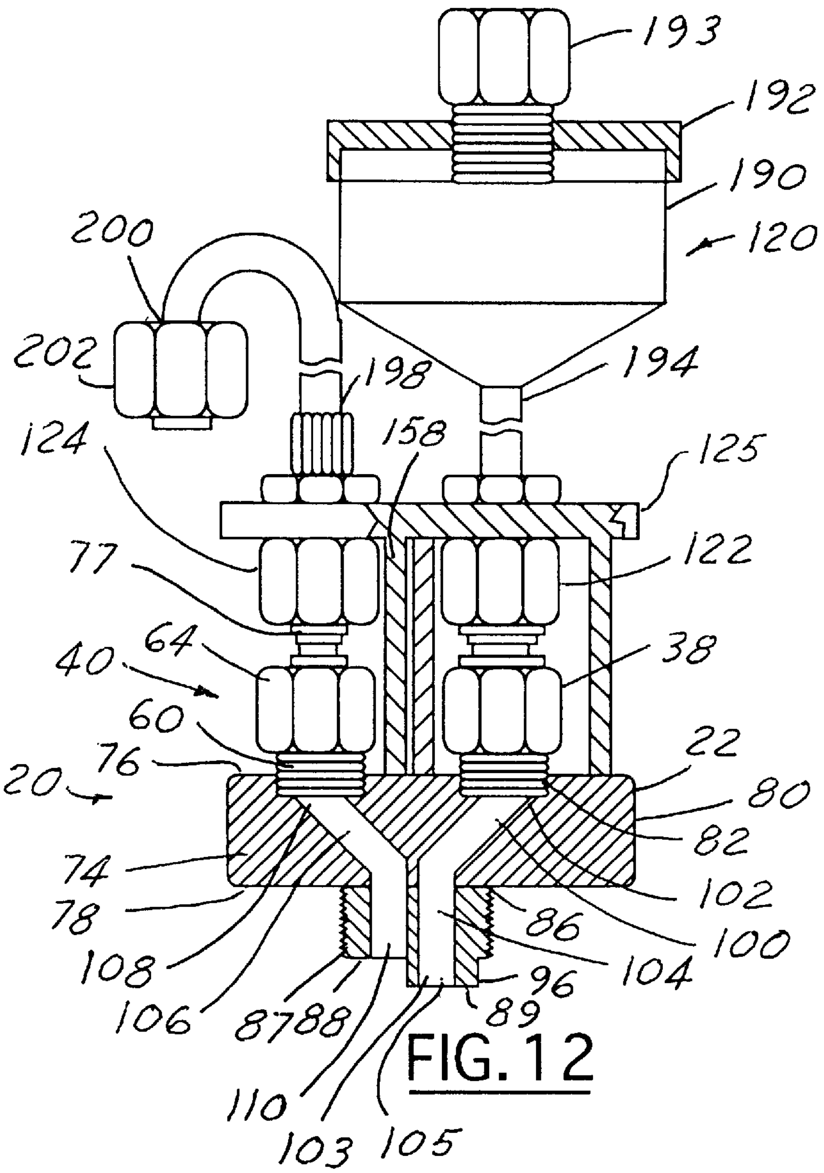
FIG. 12 is a partial cross-sectional view of a stationary part and a portable part mated together.

As shown in FIGS. 6, 8, and 12, the portable part further comprises the means for communicating indicated liquid from the stationary second quick connect outlet to a remote location comprising: a flexible outlet conduit 196 having a first end 198 in communication with the outlet of the portable part and a second end 200 attached to a portable conduit outlet quick connect 202 for communication of indicated liquid to a remote location.

The filler assembly further comprises means for communicating indicated liquid from the portable part outlet quick connect to a remote location comprising: a flexible conduit having a first end in communication with the outlet of the portable part and a second end attached to a portable conduit outlet quick connect for communication of indicated liquid to a remote location.

What is claimed is:

1. A filler assembly for communicating an indicated liquid through a container comprising:

- a stationary part adapted to cover a container and having means to communicate an indicated liquid therethrough;
- a portable part adapted to releasably, sealably mate with the stationary part, the portable part in communication with an indicated liquid source and with the stationary part;
- means for preventing improper mating of the portable part with the stationary part;
- means for sealingly mating the portable part to the stationary part; and
- means for preventing movement between the stationary part and the portable part when the stationary part and the portable part are mated.

2. The filler assembly of claim 1 wherein the stationary part comprises:

- at least a first quick connect having a cylindrical inlet portion having an opening formed therein;
- at least a second quick connect having a cylindrical outlet portion having an opening formed therein, wherein the cylindrical inlet portion and the cylindrical outlet portion have differing diameters;
- a top part wherein the top part is adapted to receive the at least two quick connects of the stationary part;

a bottom part integrally formed with the top part comprising means for sealably releasably connecting the stationary part to the container; and wherein the means for communicating liquid therethrough comprises means for communicating indicated liquid from the portable part through the inlet portion of the at least first quick connect to the container and means for communicating indicated liquid from the container through the outlet of the stationary part second quick connect to the portable part.

3. The filler of claim 2 wherein the opening formed within the inlet portion of the at least first quick disconnect has a diameter of ½ inch; and wherein the opening formed within the outlet portion of the at least second quick connect has a diameter of ⅜ inch.

4. The filler of claim 2 wherein the top part further comprises:

a uniform portion integrally formed with the bottom part wherein the uniform portion has an upper surface having at least a first recess adapted to sealingly receive the at least first quick connect, and at least a second recess adapted to sealingly receive at least the second quick connect; and an idiot-proof block integrally formed with the upper surface of the top part, the idiot-proof block adapted to engage an idiot-proof ring formed on the portable part.

5. The filler of claim 4 wherein the idiot proof block has a uniform shape and wherein the idiot proof block is positioned in a manner between the at least two recesses such that the idiot proof block is adjacent to only one of either the at least two recesses but is spaced a distance apart from the remaining at least one recess.

6. The filler of claim 5 wherein the portable part comprises:

at least one portable quick connect inlet adapted to sealingly mate with the stationary part first quick connect inlet portion for communication of indicated liquid therethrough, the at least one portable quick connect inlet has a connector portion complementary to the stationary at least one first quick connect inlet portion opening and is in communication with the stationary part when the stationary part at least one first quick connect inlet portion opening receives the at least one portable quick connect inlet;

at least one portable quick connect outlet adapted to sealingly mate with the stationary part first quick connect outlet portion for communication of indicated liquid therethrough, the at least one portable quick connect outlet has a complementary portion to the stationary at least one first quick connect outlet portion opening and is in communication with the stationary part when the stationary part at least one second quick connect receives the at least one portable quick connect outlet;

a quick connect mounting block having an idiot-proof ring adapted to engage the idiot-proof block of the stationary part;

means for mounting the at least one portable quick connect inlet and the at least one portable quick connect outlet to the quick connect mounting block;

means for securely communicating indicated liquid from an indicated liquid source to the at least one portable part quick connect inlet; and means for communicating indicated liquid from the second quick connect outlet of the stationary part to a remote location.

7. The filler assembly of claim 6 wherein the means for communicating indicated liquid from an indicated liquid source to the at least one portable part quick connect inlet comprises:

a funnel adapted to receive a cover, the funnel in communication with the portable part;

a cover for the funnel having an inlet adapted to receive indicated liquid from an indicated liquid source; and a flexible conduit in communication with an indicated liquid source and the at least one portable part inlet.

8. The filler assembly of claim 6 wherein the idiot proof ring comprises a side wall having a uniform thickness, the side wall having an interior portion adapted to surround the idiot proof block and the at least one quick connect adjacent to the idiot proof block when the portable part mates with the stationary part, the side wall interior portion having a portion complementary to the idiot proof block wherein the complementary interior portion slidably engages the idiot proof block when the portable part mates with the stationary part.

9. The filler of claim 8 wherein the means for preventing misassembly of the stationary part with the portable part comprises:

an opening having a diameter D formed within the at least one first quick connect outlet portion of the stationary part; and a cylindrical connector portion having a diameter greater than D integrally formed within the at least one portable quick connect inlet; wherein the at least one portable quick connect inlet connector portion is too large to be inserted into the at least one first quick connect outlet portion opening and is thus prevented from being wrongly inserted into the at least one first quick connect outlet portion of the stationary part.

10. The filler assembly of claim 8 wherein the means for communicating indicated liquid from the portable part quick connect outlet to a remote location comprises a flexible conduit having a first end in communication with the outlet of the portable part and a second end attached to a portable conduit outlet quick connect for communication of indicated liquid to a remote location.

11. The filler assembly of claim 8 wherein the idiot proof ring and the idiot proof block cooperate to define the means for preventing movement between the stationary part and the portable part.

12. The filler of claim 2 wherein the bottom part further comprises:

a uniform cylindrical portion having a radius R, the uniform cylindrical portion is adapted to mate with the container and comprises a top portion integrally formed with the bottom surface of the top part;

a bottom portion extending downwardly from the top portion;

an outer wall axially disposed between the top portion and the bottom portion adapted to sealingly engage the container, wherein the uniform cylindrical portion defines the means for sealably, releasably connecting the stationary part to the container; and an extended portion extending downwardly axially away from the bottom portion of the cylindrical portion, the extended portion is juxtaposed beneath the outer wall of the cylindrical portion extending radially inwardly a distance slightly less than R, wherein the extended portion operates to prevent a siphon from forming when indicated liquid is communicated from the storage compartment of the container to a remote location.

13. A filler assembly for communicating an indicated liquid through an airtight container comprising:

a stationary part adapted to cover an airtight container and having means to communicate indicated liquid therethrough wherein the stationary part further comprises at least a first quick connect having a cylindrical inlet portion having an opening formed therein;

at least an second quick connect having a cylindrical outlet portion having an opening formed therein, wherein the inlet portion opening and the outlet portion opening have differing diameters;

a top part wherein the top part has means for sealingly receiving the at least first quick connect and the at least the second quick connect;

an idiot proof block integrally formed with the top part adapted to engage an idiot proof ring formed on the portable part;

a bottom part integrally formed with the top part comprising means for sealably, releasably connecting the stationary part to the airtight container;

a portable part adapted to releasably, sealably mate with the stationary part, the portable part in communication with an indicated liquid source and with the stationary part wherein the portable part further comprises at least one portable quick connect inlet having a portable inlet cylindrical member complementary to and in communication with the stationary part first quick connect inlet portion opening, the at least one portable quick connect inlet adapted to sealingly mate with the stationary part first quick connect inlet portion for communication of indicated liquid therethrough;

at least one portable quick connect outlet complementary having a portable outlet cylindrical member complementary to and in communication with the stationary part first quick connect outlet portion opening, the at least one portable quick connect outlet is adapted to sealingly mate with the stationary part first quick connect outlet portion for communication of indicated liquid therethrough wherein the portable quick connect inlet and outlet cylindrical members have differing diameters;

a quick connect mounting block having an idiot proof ring adapted to engage the idiot proof block of the stationary part;

means for sealingly mating the portable part to the stationary part; and means for preventing improper mating of the portable part with the stationary part.

14. The filler of claim 13 wherein the portable part further comprises:

means for mounting the at least one portable quick connect inlet and the at least one portable quick connect outlet to the quick connect mounting block;

means for communicating indicated liquid from an indicated liquid source to the at least one portable part quick connect inlet; and means for communicating indicated liquid from the second quick connect outlet of the stationary part to a remote location.

15. The filler assembly of claim 13 wherein the inlet portion of the at least first quick disconnect has a diameter of ½", and wherein the outlet portion of the at least second quick connect has a diameter of ⅜".

16. The filler assembly of claim 15 wherein the inlet cylindrical member complementary portion has a diameter greater than ⅜" but less than ½".

17. The filler assembly of claim 13 wherein the inlet portion of the at least first quick disconnect has a diameter of ⅜" and wherein the outlet portion of the at least second quick connect has a diameter of ½".

18. The filler assembly of claim 17 wherein the outlet cylindrical member complementary portion has a diameter greater than ⅜" but less than ½".

19. A filler assembly for communicating an indicated liquid through an airtight container comprising:

a stationary part adapted to cover an airtight container and having means to communicate indicated liquid therethrough wherein the stationary part further comprises at least a first quick connect having a inlet portion having an opening formed therein;

at least an second quick connect having a cylindrical outlet portion having an opening formed therein, wherein the inlet portion opening and the outlet portion opening have differing diameters;

a top part wherein the top part has means for sealingly receiving the at least first quick connect and the at least the second quick connect;

a bottom part integrally formed with the top part comprising means for sealably, releasably connecting the stationary part to the airtight container;

a portable part adapted to releasably, sealably mate with the stationary part, the portable part in communication with an indicated liquid source and with the stationary part wherein the portable part further comprises at least one portable quick connect inlet having a portable inlet member complementary to and in communication with the stationary part first quick connect inlet portion opening, the at least one portable quick connect inlet adapted to sealingly mate with the stationary part first quick connect inlet portion for communication of indicated liquid therethrough;

at least one portable quick connect outlet complementary having a portable outlet member complementary to and in communication with the stationary part first quick connect outlet portion opening, the at least one portable quick connect outlet is adapted to sealingly mate with the stationary part first quick connect outlet portion for communication of indicated liquid therethrough wherein the portable quick connect inlet and outlet cylindrical members have differing diameters;

means for sealingly mating the portable part to the stationary part;

means for preventing movement between the stationary part and the portable part when the two parts are mated together; and means for preventing improper mating of the portable part with the stationary part.

* * * * *